United States Patent [19]

Tani et al.

[11] 4,297,021

[45] Oct. 27, 1981

[54] POWDER MATERIAL TRANSPORTATION APPARATUS

[75] Inventors: Tatsuo Tani, Tokyo; Yasumori Nagahara, Yokosuka; Sakae Ohta, Tokyo; Minoru Suzuki, Yokohama; Kiyozo Hashizume, Tokyo, all of Japan

[73] Assignee: Ricoh Company, Ltd., Japan

[21] Appl. No.: 45,964

[22] Filed: Jun. 6, 1979

[30] Foreign Application Priority Data

Jun. 9, 1978 [JP] Japan .......... 53-69431
Jun. 9, 1978 [JP] Japan .......... 53-69432

[51] Int. Cl.[3] .......... G03G 15/00; G01F 11/20

[52] U.S. Cl. .......... 355/3 R; 222/413; 222/DIG. 1; 355/15

[58] Field of Search .......... 355/3 R, 3 DD, 15; 222/413, DIG. 1; 198/661

[56] References Cited

U.S. PATENT DOCUMENTS

| | | | |
|---|---|---|---|
| 3,056,487 | 10/1962 | Kipper | 198/661 |
| 3,333,566 | 8/1967 | Kent | 355/3 DD X |
| 3,724,725 | 4/1973 | Stauffer | 222/DIG. 1 X |
| 3,946,910 | 3/1976 | Case | 222/DIG. 1 X |

FOREIGN PATENT DOCUMENTS

| | | | |
|---|---|---|---|
| 666666 | 10/1929 | France | 222/413 |
| 116441 | 1/1959 | U.S.S.R. | 222/413 |

OTHER PUBLICATIONS

Probst, Stewart; "Apparatus for Transporting Powdered Materials"; Research Disclosure; Dec. 1977; pp. 57 and 58.

*Primary Examiner*—Fred L. Braun
*Attorney, Agent, or Firm*—McGlew and Tuttle

[57] ABSTRACT

The powder material transportation apparatus for transporting powder materials such as developer powder, by a rotating member such as a coil is provided with an agitator for destroying a bridge of powder material which is apt to be formed in an upper portion of the rotating member. The diameter or pitch of a rotating coil member is designed to be greater in a transportation termination portion than in a transportation initiation portion, whereby the powder material transportation force is increased in the transportation termination portion and formation of the bridge of powder material is prevented.

11 Claims, 20 Drawing Figures

POWDER MATERIAL TRANSPORTATION APPARATUS

FIELD AND BACKGROUND OF THE INVENTION

The present invention relates to powder material transportation apparatus for transporting powder materials by a rotating member, such as a coil or a spiral blade, in its axial direction and more particularly to powder transportation apparatus for transporting powder developer, for use in cleaning apparatus or development apparatus of electrophotographic copying machines or of electrostatic recording machines.

In electrophotographic copying or electrostatic recording machines, latent electrostatic images formed on a photoconductor or on a dielectric material are developed by color fine powder called toner and the resulting toner images are transferred to plain paper to obtain copies. After image transfer, toner remains on the surface of the toner image bearing member, and the remaining toner has to be removed for the next copying cycle. A toner cleaning apparatus is used for performing such cleaning.

Conventionally, the toner cleaning apparatus includes a cleaning member, which contact the surface of a toner image bearing member to remove the remaining toner therefrom, and discharging apparatus for discharging the removed toner out of the toner cleaning apparatus. The discharging apparatus comprises a rotating member such as a coil or a spiral blade and is disposed near the bottom of a housing unit which is gradually narrowed in the direction of the bottom. The toner collected by the cleaning member is caused to drop into a bottom portion of the housing unit and is then discharged out of the housing unit by the discharging apparatus. In this type of cleaning apparatus when the fluidity of toner is reduced during the continuous operation of the apparatus or by some change of the ambient conditions, the toner graudually deposits and accumulates on the opposite inner walls of the housing unit, right above the discharging apparatus. As a result, a toner bridge is formed between the walls. When such a toner bridge is formed, the discharging apparatus runs idly in a vacant portion under the toner bridge and newly collected toner is piled on the bridge with the result that the collected toner overflows from the housing unit, smearing various parts of the copying machine or copies due to insufficient cleaning.

Toner removed from the surface of a photoconductor drum by a cleaning blade drops all over a transportation coil disposed at a bottom portion of the housing unit. Since the transportation coil has an equal pitch and an equal diameter along its length, it has a uniform toner transportation capacity over its entire length. However, since the transportation coil transports toner in its axial direction, toner is gradually accumulated near an outlet portion of the cleaning apparatus. This is because the amount of toner to be transported increases in the downstream direction of the transportation coil although the transportation capacity is equal in each segment of the transportation coil. When a certain amount of developer is accumulated near the outlet portion of the cleaning apparatus, a toner bridge is formed likewise and a vacant portion is formed in which the transportation coil is operated without transporting toner thereby.

SUMMARY OF THE INVENTION

A feature of the present invention is that an agitator is disposed near an upper portion of a rotating member for transporting powder material within a powder material transportation apparatus, so that formation of a bridge of powder material in the upper portion of the rotating member is prevented and stable transportation and secure discharge of powder materials are attained. The agitator is rotated or swung so that formation of the powder material bridge is prevented.

Another feature of the present invention is in that the powder material transportation force of the rotating member is changed in a predetermined range of the rotating member so that accumulation of the powder materials in a powder material discharging portion is prevented. In order to change the powder material transportation force, the pitch or winding diameter of the rotating member is changed continuously or step-by-step so that the discharged amount of the powder materials in the powder material discharging portion is increased, preventing formation of the powder material bridge.

Therefore, an object of the present invention is to provide an improved powder material transportation apparatus.

Another object of the present invention is to provide an improved powder material transportation apparatus capable of transporting powder materials smoothly and securely.

A further object of the present invention is to provide an improved powder material transportation apparatus capable of preventing formation of a bridge of powder material which is apt to be formed in an upper portion of the rotating member for transporting powder materials.

A still further object of the present invention is to provide an improved powder material transportation apparatus which is simple in the construction and inexpensive.

DESCRIPTION OF THE PREFERRED EMBODIMENTS

Figure 1:
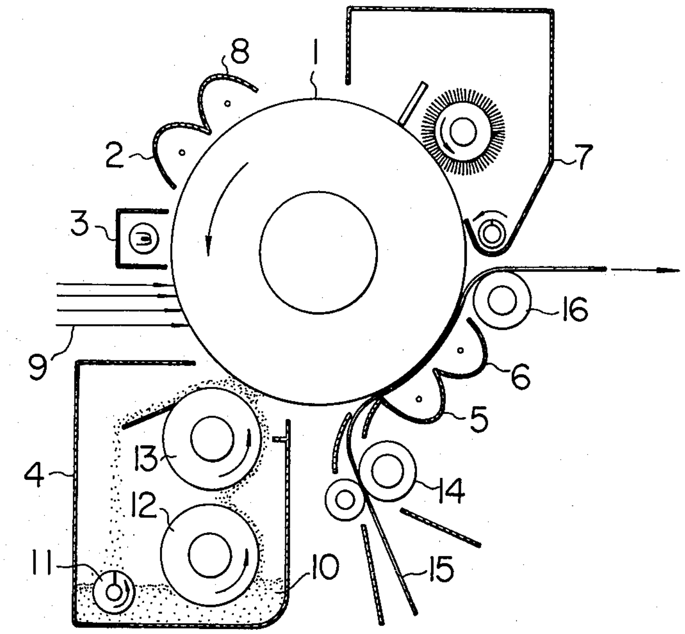
FIG. 1 is a diagrammatic figure of an electrophotographic copying apparatus in which the present invention is employed.

Referring to FIG. 1, there is diagrammatically shown an electrophotographic copying machine in which an embodiment of a powder material transportation apparatus according to the present invention is employed. In FIG. 1, a photoconductive layer is formed on the surface of a photoconductor drum 1, and around the drum are: a charging corona charger 2, an erase lamp 3, development apparatus 4, an image transfer corona charger 5, a sheet separation corona charge 6, a cleaning apparatus 7 and a quenching corona charger 8. The photoconductive layer of the photoconductor drum 1 is charged uniformly by the charging corona charger 2 and electric charges in predetermined non-image areas are then erased by the erase lamp 3. An optical image 9 of an original document to be copied is then projected on the uniformly charged photoconductive layer by an exposure apparatus (not shown) so that charges on the surface of the photoconductor are selectively erased in accordance with the lightness of the projected image and a latent electrostatic image of the original document is formed.

The latent electrostatic image is developed by toner supplied from the development apparatus 4, which is of a magnetic brush type and comprises two magnetic rollers 12 and 13. In the development apparatus 4, developer 10 comprising toner and carrier is triboelectrically charged by a stirring screw 11 and is then scooped up by the magnetic rollers 12 and 13. The scooped developer is brought into contact with the surface of the photoconductor drum 1 to develop the latent electrostatic image. A transfer sheet 15, fed from a sheet feed apparatus 14, is superimposed on the toner image obtained by development and electric charges are applied to the back side of the transfer sheet 15 by the image transfer corona charger 5 to transfer the toner image on the drum 1 to the sheet 15. The charges on the drum 1 and the transfer sheet 15 are quenched by the sheet separation corona charger 6 to make it easy to separate the transfer sheet 15 from the surface of the photoconductor drum 1, and the transfer sheet 15 is separated from the surface of the drum 1 by a sheet separation roller 16. Toner remaining on the surface of the drum 1 is removed by the cleaning apparatus 7 and electric charges remaining on the surface of the photoconductor drum 1 are quenched by the quenching corona charger 8. This completes one copying cycle.

Figure 2:
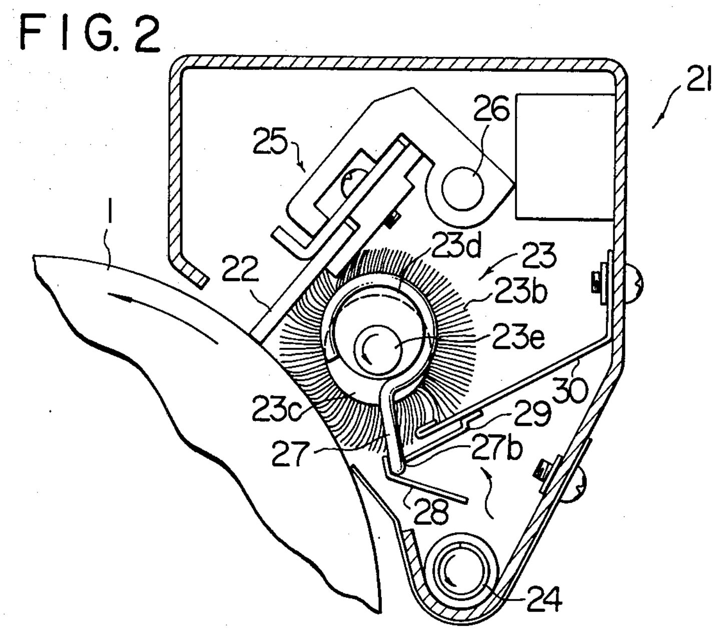
FIG. 2 is a schematic sectional view of an embodiment of a powder material transportation apparatus according to the present invention.

Referring to FIG. 2, there is shown an example of the cleaning apparatus 7 in which the present invention is employed. In a housing unit 21, there is a cleaning blade 22 and a cleaning brush 23 in contact with the surface of the photoconductor drum 1. Under the cleaning brush 23, there is a toner discharging coil 24 in the housing unit 21. The cleaning blade 22 is held by a holder unit 25, which is mounted rotatably on a shaft 26. By a pressure application apparatus (not shown), a top portion of the cleaning blade 22 is pressed against the surface of drum 1 when the cleaning apparatus 7 is in operation.

Figure 3:
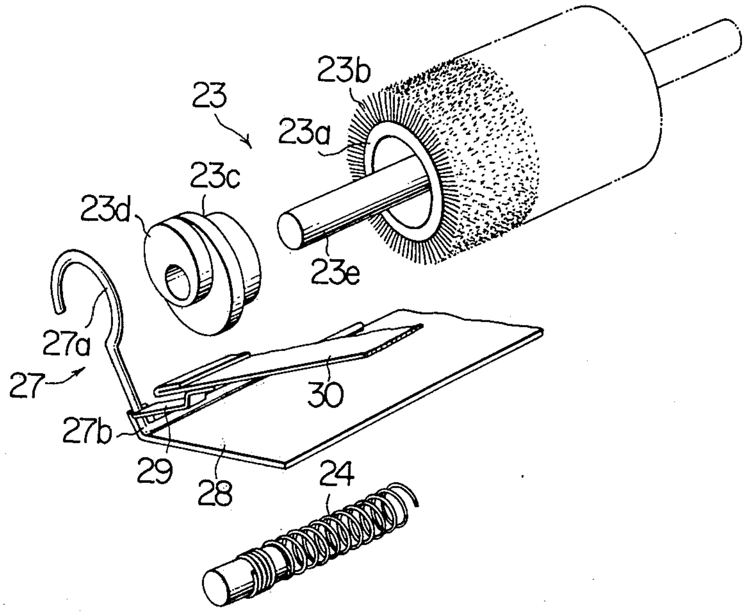
FIG. 3 is a schematic perspective view of the main portions of the powder material transportation apparatus of FIG. 2.

As illustrated in FIG. 3, the cleaning brush 23 comprises: a cylinder 23*a*, a brush portion 23*b* formed in the peripheral portion of the cylinder 23*a*, a flange 23*c* fixed to one end portion of the cylinder 23*a*, an eccentric cam 23*d* integrally fixed to the flange 23*c*, and a rotating shaft 23*e* which, passing through the cylinder member 23*c*, is fixed to the flange 23*c*. A hook portion 27*a* of an operation member 27 loosely holds the peripheral surface of the eccentric cam 23*d*. A base portion 27*b* of the operation member 27 extends in the axial direction of the cleaning brush 23 and a swingable plate 28 is fixed to the base portion 27*b* of the cleaning brush 23. The plate 128 forms stirring means for the toner. Each end portion of the cleaning brush 23 is of the same construction.

The housing unit 21 is gradually narrowed toward the bottom so that toner scraped from the surface of the drum 1 is collected in the bottom portion where the toner discharging coil 24 is rotating. The toner discharging coil 24 is made of piano wire wound in a regular spiral. Alternatively, a rotating shaft with thin helical fins therearound and a ladder chain can be used.

The action of the cleaning apparatus 21 will be now explained with reference to FIG. 2. The residual toner collected from the surface of the photoconductor drum 1 by the cleaning brush 23 and the cleaning blade 22 is transported into a lower portion of the housing unit 21 by the rotation of the cleaning brush 23 and is then transported by the toner discharging coil 24 in its axial direction. Toner adhering to the cleaning brush 23 is scraped off by a scraper plate 30 and discharged. In the meantime, the eccentric cam 23*d* is rotated as the cleaning brush 23 is rotated. By the rotation of the eccentric cam 23*d*, the swingable plate 28 is moved up and down and left and right by the operation plate 27 whose hook portion 27*a* fits loosely on the eccentric cam 23*d*, whereby formation of a toner bridge above the toner dishcarging coil 24 is prevented. As mentioned previously, the operation member 27 fits loosely on the eccentric cam 23*d*. However, in order to prevent the operation lever 27 from following the rotation of the eccentric cam 23*d*, the base portion 27*b* of the operation member 27 is in contact with a top end of a stopper 29 which is fixed to each side of the scraper plate 30. The scraper plate 30 is disposed for scraping toner from the cleaning brush 23, with a top portion of the scraper plate 30 inserted into the brush portion 23*b* (FIG. 3). On one side of the housing unit 21, another toner transportation apparatus is connected to the toner discharging coil 24 to lead the toner discharged by the toner discharging coil 24 to a toner replenishment tank of the development apparatus in order to reuse the discharged toner in the development apparatus, or to a toner recovery tank.

Figure 4:
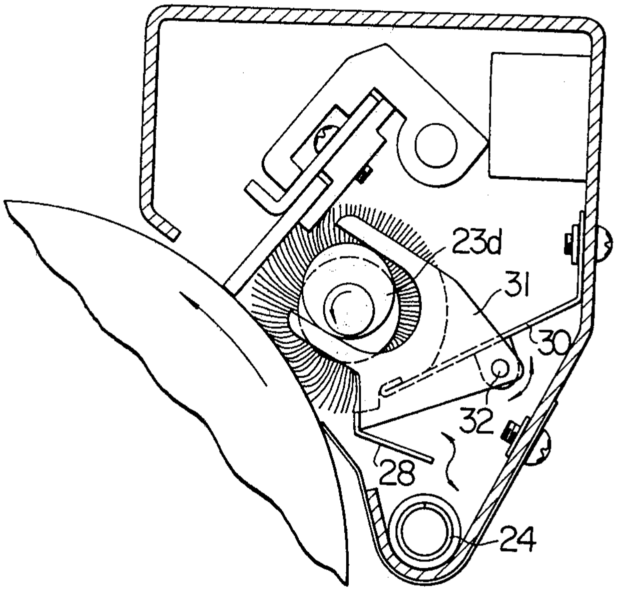
FIG. 4 is a schematic sectional view of another embodiment of a powder material transportation apparatus according to the present invention.

In the above-mentioned embodiment, the eccentric cam 23*d*, the operation member 27 and the swingable plate 28 constitute an agitator, with the operating member 27 forming connecting means. In another embodiment shown in FIG. 4, the eccentric cam 23*d*, a cam follower 31 and the swingable plate 28 constitute an agitator, with the follower 31 forming the connecting means. The cam follower 31 has a U-shaped notch into which the eccentric cam 23*d* loosely fits and a support shaft 32, which is pivotally mounted on the scraper plate 30, on a corner of the cam follower 31 on the opposite side of the U-shaped notch, there is fixed the swingable plate 28. The swingable plate 28, supported by the support shaft 32, is moved up and down, left and right, so that formation of a toner bridge, which might be formed on the toner dishcarging coil 24, but for the swingable plate 28, is always prevented.

The agitator in the present invention is not limited to the one using the eccentric cam 23*d* as in the above-mentioned embodiments, but various known mechanism capable of providing swingable movements and linear reciprocal movements can be used as well. Furthermore, the arrangement and construction of the cleaning blade 22 and the cleaning brush 23 are not limited to the ones in the above-mentioned embodiments. With respect to the swingable plate 28, a plate with apertures, a wire mesh, a rod-shaped member and other members can be used.

Figure 5:
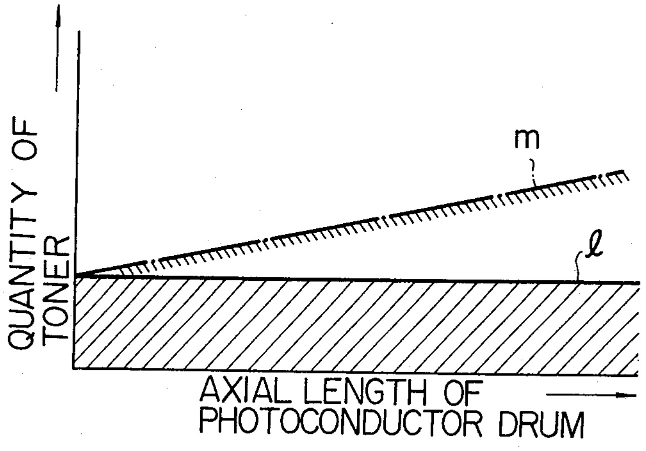
FIGS. 5, 6 (*a*), 6 (*b*), and 7 are diagrammatic figures for explaining the priciple of a further embodiment of the present invention.

As shown by line l in FIG. 5, the quantity of toner removed from the surface of the photoconductor drum 1 by the cleaning blade 22 and supplied to the toner discharging coil 24 is almost uniform in the axial direction of the photoconductor drum 1. Of course, in each copy the quantity of toner in the axial direction of the photoconductor drum 1 may differ from place to place. However, when a number of copies are made, the quantity of toner in the axial direction of the drum 1 becomes almost uniform.

Figure 6A:
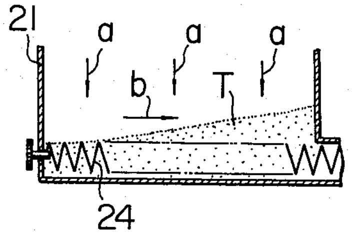
Figure 6B:
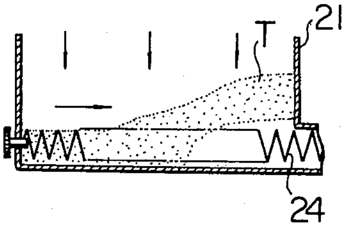

In FIGS. 6 (*a*), the toner powder T is transported by the toner discharging coil 24 axially in the direction of the arrow b after falling from the direction of the arrow a, and the transportation force gradually increases in the direction b. Referring back to FIG. 5, line m indicates the quantity of toner transported by the toner discharging coil 24. On the toner, discharge side of the housing unit 21, the toner transportation force of the toner discharging coil 24 becomes insufficient relative to the quantity of toner transported thereto. As a result, a large quantity of toner accumulates in the toner discharge portion, so that a toner bridge as shown in FIG. 6 (*b*) tends to be formed, causing the toner discharging coil 24 to be rotated without any load thereon. In order to prevent formation of such toner bridge, it is necessary to measure the quantity of toner which is collected by the cleaning blade 22 and other devices and supplied to the toner discharging coil 24 in its axial direction and to determine an appropriate toner force in the axial direction of the toner discharging coil 24.

Figure 7:
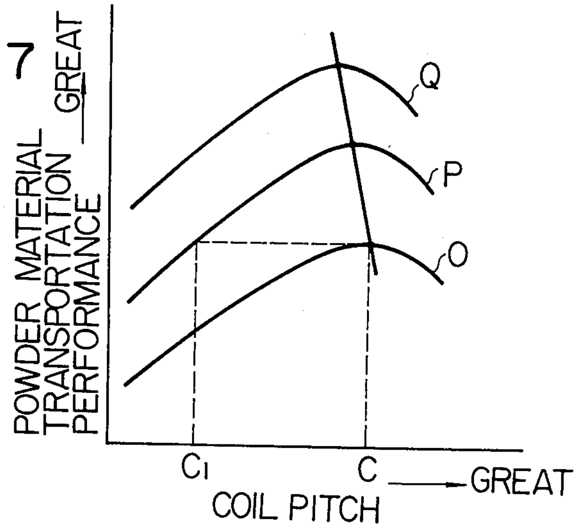

Referring to FIG. 7, there are shown the experimental results of the change of powder transportation performance, or force, of the toner discharging coil 24 when its coil pitch and coil diameter are changed. Curves Q, P and Q indicate the powder transportation force when the coil diameter r is changed. In FIG. 7, the diameter of the toner discharging coil in the curve P is greater than that of the coil in the curve Q, but smaller that that of the coil in the curve 0. The experiments of the inventors of the present invention showed that when the diameter of the coil was the same, the powder transportation force was increased as the coil pitch was increased, but when the coil pitch was increased beyond a certain limit, the powder transportation force decreased. In the case where the coil pitch was the same, the powder transportation force was increased as the diameter of the coil was increased.

Therefore, when a coil having the characteristic of the curve P is used, as a first coil, the coil pitch of the first coil is increased gradually from its base end and when the coil pitch becomes equal to C, a second coil having the characteristic of the curve P is used and the coil pitch of the second coil is increased, starting at the pitch $C_1$, whereby the powder transportation force is increased continuously.

Figure 8:
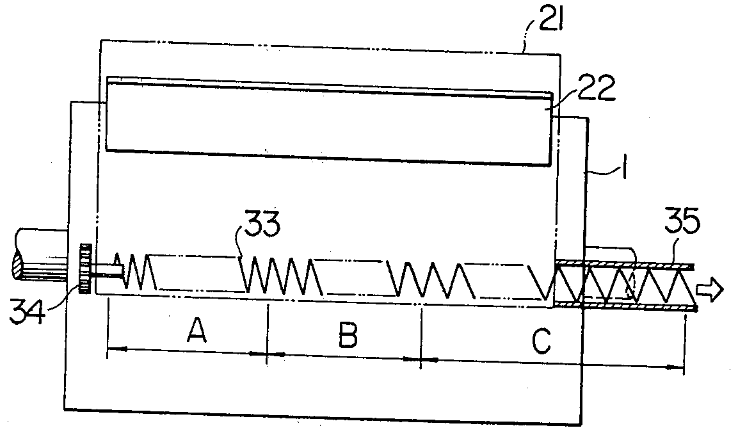
FIG. 8 is a diagrammatic figure of a still further embodiment of the present invention.

FIG. 8 shows diagrammatically a toner transportation apparatus having a coil of the above-mentioned type. The overall construction of the toner transportation apparatus is the same as that of the toner transportation apparatus in FIG. 2. The cleaning blade 22, except its opposite end portions, is in pressure contact with the surface of the photoconductor drum 1. Under the housing unit 21, there is rotatably situated a coil 33 which extends parallel to the shaft of the drum 1 and serves as the toner transportation apparatus. One end of the coil 33 is attached to a drive gear 34 and the other end of the coil 33 is inserted into a toner transportation pipe 35 which is connected to the housing unit 21. The coil 33 is divided longitudinally into three portions A, B and C. In each portion, the coil pitch is different. In the portion A of the coil 33, where toner transportation is started, the coil pitch is small. However, the coil pitch is increased in the toner transportation direction. In other words, the coil pitch of the portion B is greater than that of the portion A, and the coil pitch of the portion C is greater than that of portion B.

In the above-mentioned embodiment, the coil is divided into three portions. However, it can be divided into two or four or more, and the length of each portion is not necessarily equal but can be changed if desired so long as a plurality of the coils that constitute the coil 33 have to be wound so as to transport toner in the same direction (In FIG. 8, in the right direction) in the portion where toner is supplied to the coil 33 by the cleaning blade and other devices.

Figure 9:
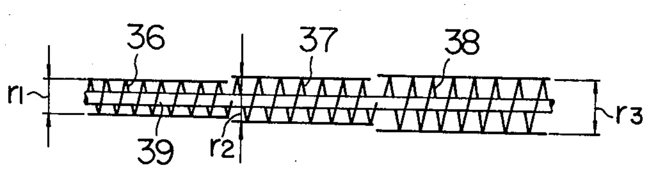
FIG. 9 is a diagrammatic figure of the main portion of a further embodiment of the invention.

As shown in FIG. 9, the coil 33 can be constructed by connecting three coils 36, 37 and 38 together to a shaft 39. The pitches of these coils are equal but their respective coil diameters are different and are, respectively $r_1$, $r_2$ and $r_3$. The value of $r_2$ is greater than $r_1$, but smaller than $r_3$, that is $r_1 < r_2 < r_3$. Therefore, the coil 38 has the greatest powder transportation force and the coil 37 has smaller powder transportation force than that of the coil 38, and the coil 36 has smaller powder transportation force than that of the coil 37. By construction the coil 33 in this manner, its powder transportation force can be increased in the toner discharging direction, so that formation of a toner bridge in the toner discharging portion can be prevented. As mentioned previously, powder transportation force of the coil can be increased by increasing the coil diameter thereof. However, the coil diameter cannot always be increased beyond certain limits due to the convenience of design of the powder transportation apparatus. When the coil diameter cannot be increased, changing the coil pitch is very effective to improve the powder transportation force.

In certain electrophotographic copying machines, each original document to be copied is placed on a contact glass with one end of the original document in line with a certain standard portion of the photoconductor drum. In such electrophotographic copying machines, the quantity of toner collected by the cleaning apparatus is not uniform in the axial direction of the photoconductor drum, but more toner remains in the standard portion of the drum. Therefore, if a toner discharging portion is disposed on the same side as that of the standard portion of the drum, it is essential to increase the toner transportation force of the toner transportation apparatus such as a coil particularly in the toner discharging portion. On the contrary, if the toner discharging portion is disposed on the opposite side from that of the standard portion of the drum, great toner transportation force is required in the toner transportation initiation portion.

Figure 10:
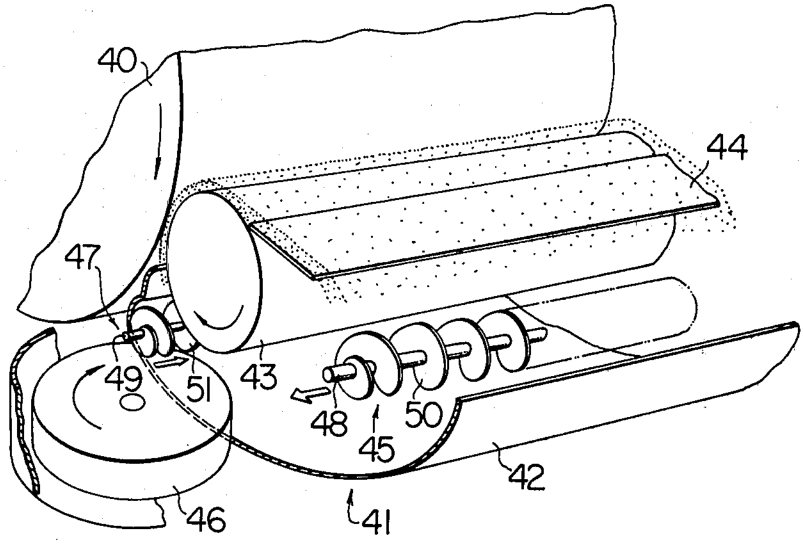
FIG. 10 is a schematic perspective view of a further embodiment of the invention.
Figure 11:
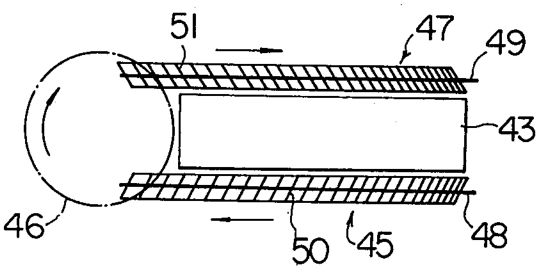
FIG. 11 is a diagrammatic figure of the main portion of the apparatus of FIG. 10.

Referring to FIGS. 10 and 11, there is shown schematically a further embodiment of a powder transportation apparatus according to the present invention. FIG. 10 illustrates a development apparatus of a copying machine, in which the embodiment of the invention is employed. In FIG. 10, reference numeral 40 represents a latent electrostatic image bearing member on which latent electrostatic images are formed. A photoconductor drum and a dielectric material drum can be used as the latent electrostatic image bearing member 40. When the former is used, latent electrostatic images are formed by a first charging followed by projection of light images. When the latter is used, latent electrostatic images are formed by a recording electrode, such as a multi-stylus element. Reference numeral 41 represents the development apparatus as a whole, and comprises: a developer container 42, a development roller 43, a scraper plate 44, first transportation apparatus 45, a turntable 46 and second transportation apparatus 47. The development roller 43 comprises a non-magnetic sleeve with an internally disposed magnet, attracting a two-component type developer comprising toner and carrier, held in the developer container 42, to the non-magnetic sleeve by the magnetic attraction of the magnet and forming a magnetic brush on the surface of the development roller 43, with the result that the developer is scooped up in the rotating direction of the development roller 43. The first transportation apparatus 45 and the second transportation apparatus 47 respectively comprise spiral screw blades 50 and 51 formed on shafts 48 and 49. The first transportation apparatus 45 is disposed on the front side of the development roller 43 and the second transportation apparatus 47 on the back side of the development roller 43. As they rotate, the developer is transported parallel to the shafts 48 and 49 in the directions of the respective arrows. The first transportation apparatus 45 is disposed in a position where the developer falling from the scraper plate 44 can be received by the first transportation apparatus 45. As shown in FIG. 11, the respective pitches of the spiral screw blades 50 and 51 of the first transportation apparatus 45 and the second transportation apparatus 47 are varied. More specifically, the pitch of the spiral screw blades of the first transportation apparatus 45 becomes greater in the developer transportation direction, while the pitch of the spiral screw blades of the second transportation apparatus 47 becomes greater in the reverse direction with respect to the developer transportation direction, whereby the developer transportation power is increased appropriately in the respective directions. In the first transportation apparatus 45, the developer is supplied uniformly in the axial direction from the scraper plate 44. However, since the developer transportation force of the apparatus 45 is increased in the developer transportation direction, the developer does not accumulate near the turntable 46. In contrast with this, in the second apparatus 47, a large quantity of the developer is supplied from the turntable 46. However, since the developer transportation force near the turntable 46 has been increased, the developer does not accumulate near the turntable 46.

The operation of the development apparatus 41 will not be explained. The developer supplied uniformly to the development roller 43 in its axial direction by the second transfer apparatus 47 is scooped up by the development roller 43 and a magnetic brush is formed on the surface of the development roller 43. The thus-formed magnetic brush is brought into contact with the latent electrostatic image bearing member 40 for development of latent electrostatic images thereon. The developer, passing through the development section, is scraped from the development roller 43 by the scraper plate 44 and is then returned to the developer container 42. Under the scraper plate 44, there is situated the first transportation apparatus 45 which receives the scraped developer therein and transports the developer in the direction of the turntable 46 while stirred. The turntable 46 is rotated so as to change the transportation direction of the developer by 180° in order to transport the developer from the first transportation apparatus 45 to the second transportation apparatus 47. So long as the turntable 46 performs the above-mentioned functions, any shape and any construction can be adopted. For instance, a water wheel type device can be employed.

Furthermore, in order to supply a predetermined amount of toner to the photoconductor drum 40 from a hopper, which extends in the axial direction of the drum, through a toner supply outlet formed in a lower or side portion of the hopper, the present invention can be employed likewise in a toner transportation apparatus which extends parallel to the axial direction of the photoconductor drum, under the toner outlet, and which is buried in the supplied toner, whereby a problem of lowering the toner concentration at the opposite side portions of the developed image, which may occur due to non-uniform toner supply caused by adhesion of toner to the side wall of the hopper, can be eliminated.

In the above-mentioned embodiment, the agitator can be disposed in the most appropriate position.

As mentioned previously, the toner powder transportation apparatus can be employed when toner collected by the cleaning apparatus is transported to a tank of the development apparatus or to a different tank to reuse the toner. When the toner powder transportation apparatus is used in the above-mentioned case, some means for transporting the toner while preventing the solidification of the toner will be necessary, since the toner is a powder. When fluid materials are transported, the transportation direction can be changed as desired. However, when solid materials such as toner powder are transported, the transportation direction cannot be changed since solidification of solid materials and suitable transportation means for such material become problems. Therefore, when the transportation direction of powder materials is changed in the course of the transportation thereof, two or more transportation passages have to be connected together.

Figure 12:
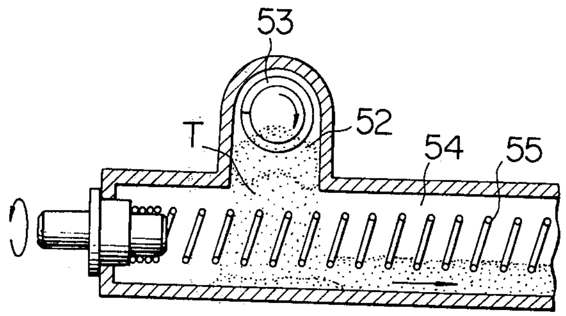
F I G. 12 PRIOR ART
FIG. 12 is a partial schematic sectional view of a conventional powder material transportation apparatus in which two powder material transportation passages are crossed.

Conventionally, in order to change the transportation direction of toner powder in a toner powder transportation apparatus, two transportation passages are crossed three-dimensionally as illustrated in FIG. 12. In FIG. 12, in a first transportation passage 52 which extends perpendicular to the figure, there is a first transportation coil 53 and, by the rotation of the first transportation coil 53, toner T is transported in the axial direction of the first transportation coil 53. An outlet of the first transportation passage 52 is connected to a second transportation passage 54 under the first transportation passage 52. Inside the second transportation passage 54, there is a second transportation coil 55 and, by the rotation of the second transportation coil, toner T transported from the first transportation passage 52 is transported in the direction of the arrow. In this apparatus, transportation of the toner T from the first transportation passage 52 to the second transportation passage 54 is performed by gravity. The weight of the toner T is extremely small and some of the recovered toner T is charged under unusual circumstances. Therefore, some of the toner T does not fall under its own weight from the the first transportation passage 52 to the second transportation passage 54 but adheres to the inner wall of the connecting portion of the two transportation passages 52 and 54. The toner T that adheres to the inner wall is gradually built up and is solidified. As a result, the so-called toner bridge is formed. When the toner bridge is formed, the effective transportation area of the transportation passages becomes so small that transportation of the toner from the first transportation passage 52 to the second passage 54 becomes difficult until, finally, the transportation passages are clogged with the toner and transportation of the toner becomes impossible. In order to destroy such toner bridge mechanically, the previously mentioned agitator can be placed in the connecting portion of the two transportation passages 52 and 54. However, incorporation of the agitator will make the transportation apparatus mechanically complex and oversized, lowering the reliability of the apparatus and making the apparatus more expensive.

In the method of letting toner fall down under its own weight, the second transportation passage 54 has to be positioned under the first transportation passage 52, which may occupy a large space in the transportation apparatus.

In order to give a solution to the above-mentioned problems, it is necessary that one transportation passage having a drive means for transporting toner powder and the other transportation passage be connected together in such a manner that the respective transportation directions of both transportation passages are in the same or nearly the same plane, whereby toner transported forcibly through one transportation can be transported into the other transportation passage as it is, so that formation of a toner bridge is always prevented and even if a toner bridge is formed, it can be destroyed. Thus, smooth toner transportation can be attained. Furthermore, since the two transportation passages are connected in the same plane, the above-mentioned effect can be obtained without any additional means, so that the transportation apparatus can be made small in size, mechanically simple, and highly reliable.

Figure 13:
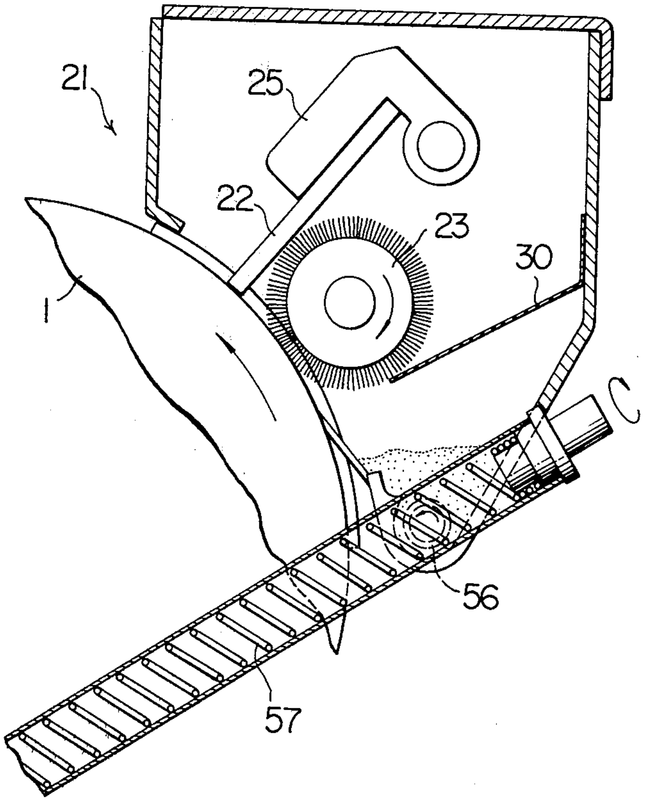
FIG. 13 is a schematic sectional view of a further embodiment of the present invention.

FIG. 13 diagrammatically illustrates a powder toner transportation apparatus of the above-mentioned type according to the invention, together with a cleaning apparatus employed in combination with the powder toner transportation apparatus. The cleaning apparatus in FIG. 13 is the same as that in FIG. 2. Therefore, each member of the cleaning apparatus in FIG. 13 has the same reference numeral as that of each member of the cleaning apparatus in FIG. 2 and the explanation of those members is omitted here.

Toner, collected from the surface of the photoconductor drum 1 by the cleaning brush 23 and the cleaning blade 22, is transported in the axial direction of the first transportation coil 56 within the housing unit 21 by the rotation of the first transportation coil 56. On a side plate on the back side of the housing 21, there is mounted a toner transportation pipe (not shown) for holding the first transportation coil 56 therein. The toner transportation pipe extends to the back side of the side plate and a top portion of the toner transportation pipe opens into the center of the second transportation coil 57 which is disposed at a right angle with respect the transportation coil 56.

Figure 14:
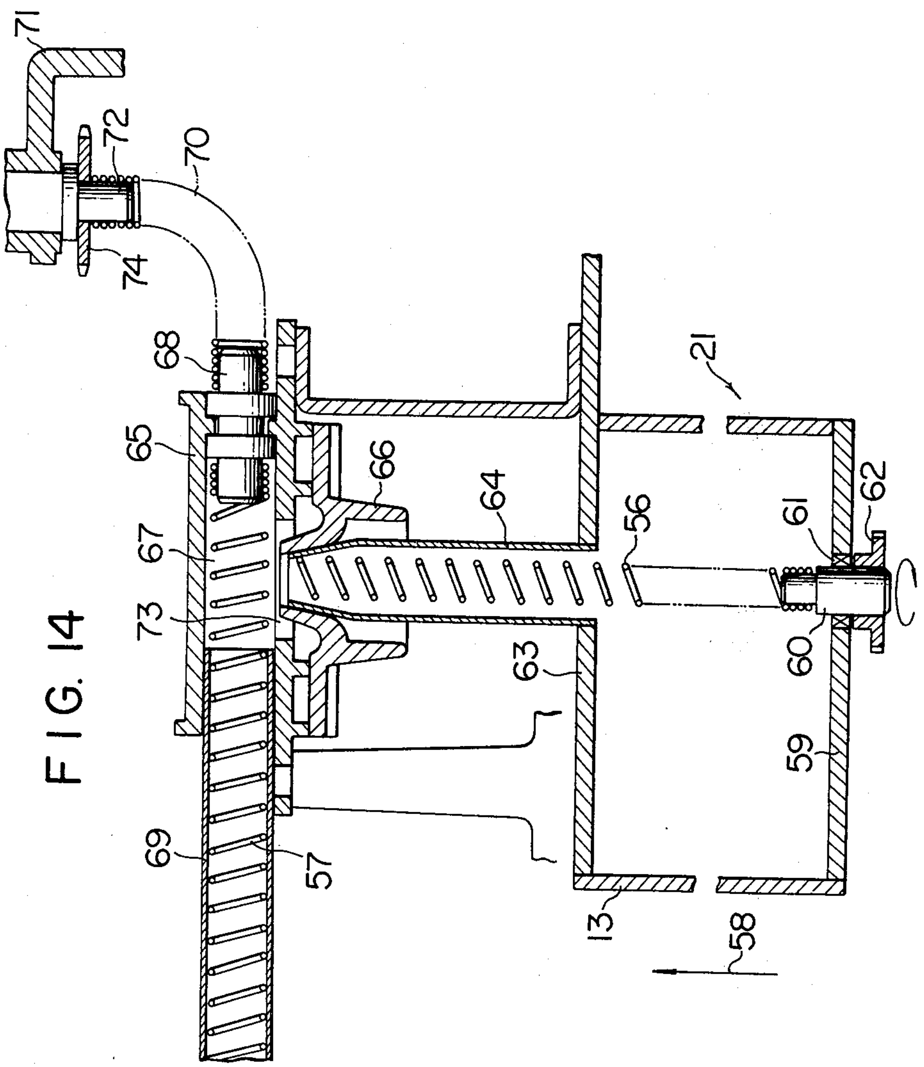
FIG. 14 is a schematic transverse sectional view of the apparatus of FIG. 13.

FIG. 14 more specifically illustrates the arrangement of the toner transportation pipe. FIG. 14 is a transverse sectional view of FIG. 13. In FIG. 14, the housing unit 21 of the cleaning apparatus is partly omitted. Actually, the housing unit 21 extends in the axial direction of the photoconductor drum 1 as indicated by arrow 58, and is longer than there is room to illustrate fully. On a front side plate 59 of the housing unit 21, a coil rotation shaft 60 is mounted through a bearing member 61. On an outer end portion of the coil rotation shaft 60, there is mounted a gear 62 through which driving force is transmitted to the coil rotation shaft 60. To the opposite top end portion of the coil rotation shaft 60, there is fixed one end of the first transportation coil 56 which is fastened to the coil rotation shaft 60 by rotating the first transportation coil 56 in the coil winding direction. The first transportation coil 56 is constructed by winding a 1.2 mm line diameter piano wire spirally with 6 mm pitch and 9 mm inner diameter and is driven at 80 rpm. To a back side plate 63 of the housing unit 21, there is attached a transportation pipe 64, made of copper, which holds the first transportation coil 56 therein and extends in the axial direction of the photoconductor drum 1 from the back side plate 63. The end portion of the transportation pipe 64 is tapered and is engaged with a rubber packing 66 attached to a coupler 65. In the coupler 65, there is a channel 67 which opens at a right angle with respect to the axial direction of the photoconductor drum 1. To one end of the coupler 65, there is attached rotatably a coil rotation shaft 68 and, to the other end of the coupler 65, there is attached another transportation pipe 69. The outer end portion of the coil rotation shaft 68 is connected to a drive shaft 72, which is supported by a support member 71, through a spring joint member 70 and which is disposed in the axial direction of the photoconductor drum 1. Into the inner end portion of the coil rotation shaft 68, there is inserted one end portion of the second transportation coil 57 which is fastened to the shaft 68 by rotating the shaft 68 in the coil winding direction as in the case of the first transportation coil 56. The second transportation coil 57 is constructed by winding a 0.8 mm diameter piano wire spirally with 7 mm pitch and 9 mm inner diameter and is driven at 180 rpm. In a side portion of the coupler 65, there is formed a hole 73 into which an end portion of the transportation pipe 64 for holding the first transportation coil 56 is inserted.

The toner transportation direction of the first transportation coil 56 and the toner transportation direction of the second transportation coil 57 are crossed in the same plane in the coupler 65. Therefore, toner transported from the housing unit 21 by the first transportation coil 56 is first pushed from the end of the transportation pipe 64 against the second transportation coil 57 and the inner wall of the coupler 65 and is then transported from the coupler 65 into the transportation pipe 69 by the second transportation coil 57 in a predetermined direction. The other end portion of the transportation pipe 69 is connected to a toner recovery container for recovering toner and discarding it.

When powder toner is transported most appropriately by the transportation coil, toner is not pushed by its coil portion but is packed in a cylindrical shape within the inner diameter portion of the transportation coil and the cylindrically packed toner is transported. Therefore, its pushing force is strong so that even if toner is blocked within the connecting portion of the two transportation pipes 64 and 69 and a toner bridge is formed, such toner bridge will be promptly destroyed. As a result, smooth toner transportation can be attained. When the transportation distance is short, toner can be transported within a portion of the transportation pipe where the transportation coil is not disposed therein.

Figure 15:
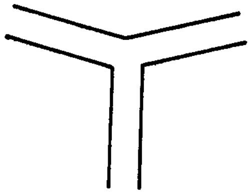
FIGS. 15,16 and 17 show diagrammatically modified connections of two powder material transportation passages.
Figure 16:
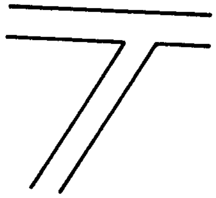
Figure 17:
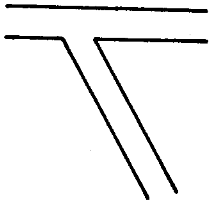

In the above-mentioned embodiment, the first transportation passage and the second transportation passage are crossed in a T-shape. Such T-shaped crossing of the two transportation passages can be modified as illustrated in FIG. 15 through FIG. 17. Instead of the transportation coil, a screw can be employed. In a powder material transportation apparatus having more than two different transportation passages, the present invention can be adopted in each connecting portion.

The above-mentioned transportation coils are continuously driven during a recording process, for instance, in the case of electrophotographic copying process, during the period of time starting with the charging of a latent electrostatic image bearing material and ending with the quenching of the latent electrostatic image bearing material.

In general, the space between the cleaning section and the toner recovery section is long in electrophotographic copying machines. Therefore, when the rotation of toner transportion members is stopped, some toner remains in the toner transportion passage. When the recording apparatus is used frequently, such remaining toner is transported during the next recording process. Therefore, the remaining toner does not cause any problem. However, when the recording apparatus is stopped for a long period of time, sometimes toner particles cling together and form a lump within the toner transportation passage due to heat, humidity or abnormal charges on the toner particles. This causes a serious problem when toner is transported or receovered. Occasionally, recovery of toner becomes completely impossible, wih the result that toner overflows from the cleaning apparatus.

Moreover, when recording of information with large image areas and high image density is performed frequently although the toner transportation capacity is insufficient, there is a risk that toner may overflow from the cleaning section since toner transportation cannot keep up with the recording of such information. The problem caused by the toner remaining in the transportation passage can be solved by operating the transportation members continuously even after the copying process is over and stopping the operation of the transportation members when toner has been completely recovered in the toner recovery section.

If the transportation members are operated constantly, the toner transportation capacity is constant with respect to a predetermined amount of toner. Furthermore, since the length of the toner transportation passage is constant, the time required for recovering the predetermined amount of toner into the toner recovery section is also constant. Based on this supposition, the maximum amount of toner that can be recovered in each copying process is obtained experimentally and the time required for recovering the maximum amount of toner is determined. From this result, the time necessary for operating the transportation members continuously after each copying process is over can be determined.

In the above-mentioned case, the transportation members have to be operated for a predetermined period of time after each copying process is completed. Accordingly, the main power supply to the copying machine has to be stopped at the predetermined time after each copying process is over.

Generally, toner remains in the second transportation pipe 69. In other words, when the operation of the transportation members is stopped at completion of the copying process, toner in the cleaning apparatus has already been discharged from the first toner transportation pipe 64. Therefore, in order to recover the toner in the second toner transportation pipe 69 after each process is over, it is no longer necessary to operate the first transportation coil 56, but it is required to operate the second transportation coil 57 only. Furthermore, since the quantity of toner to be recovered by the second transportation coil 57 is generally so small that the remaining toner can be recovered sufficiently by operating the second transportation coil 57 at a low speed.

Figure 18:
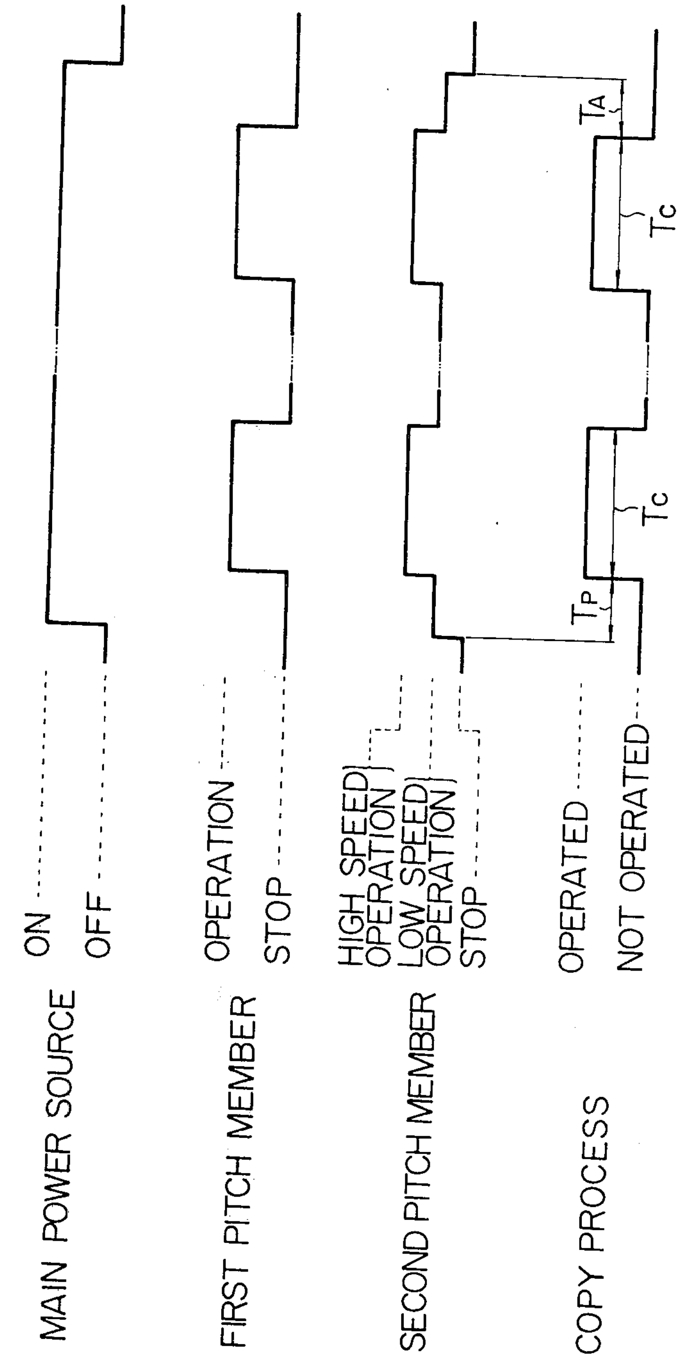
FIG. 18 is a timing chart for operating a further embodiment of the invention.

Therefore, in the case of the electrophotographic copying apparatus employed in the present invention, the relationship between the operation time of the toner transportation recovery apparatus and the working time of the recording process is determined as indicated in FIG. 18.

Supposing that n copies ($n \geqq 1$) are made continuously by the electrophotographic copying apparatus, when the main power is supplied to the copying apparatus with a main power source connected to the copying apparatus, the copying apparatus becomes ready for copying in $T_p$ (time). If an image fixing roller is of a heat roller type, $T_p$ can be determined from the time required for heating the image fixing roller to a predetermined temperature. If the image fixing roller is of a pressure roller type, $T_p$ is almost zero.

When the coping apparatus becomes capable of making copies, the copying process is performed n times automatically or manually. The time required for each copying process is indicated by Tc in FIG. 18. When time $T_A$ has elapsed after a copying process, the main power source is disconnected from the copying apparatus and supply of the main power to the copying apparatus is stopped.

The first transportation coil 56 is driven by a main motor in synchronism with the copying process only when the copying process is being carried out. In the meantime, the second transportation coil 57 is continuously operated so long as the main power is supplied to the copying apparatus and furthermore, the second transportation coil 57 is rotated at a high speed with the toner transportation force enhanced when the copying process is effected. When the copying process is not being carried out, the second transportation coil 57 is rotated at a low speed with the toner transportation force reduced. Thus, when all of the toner in the toner transportation passages has been recovered, the main power source is disconnected from the copying apparatus.

The constant time $T_A$ indicated in FIG. 18 is set slightly longer than the time required for recovering toner completely by rotating the second transportation coil 57 at the low speed after each copying process when the quantity of toner to be receovered is maximum.

Figure 19:
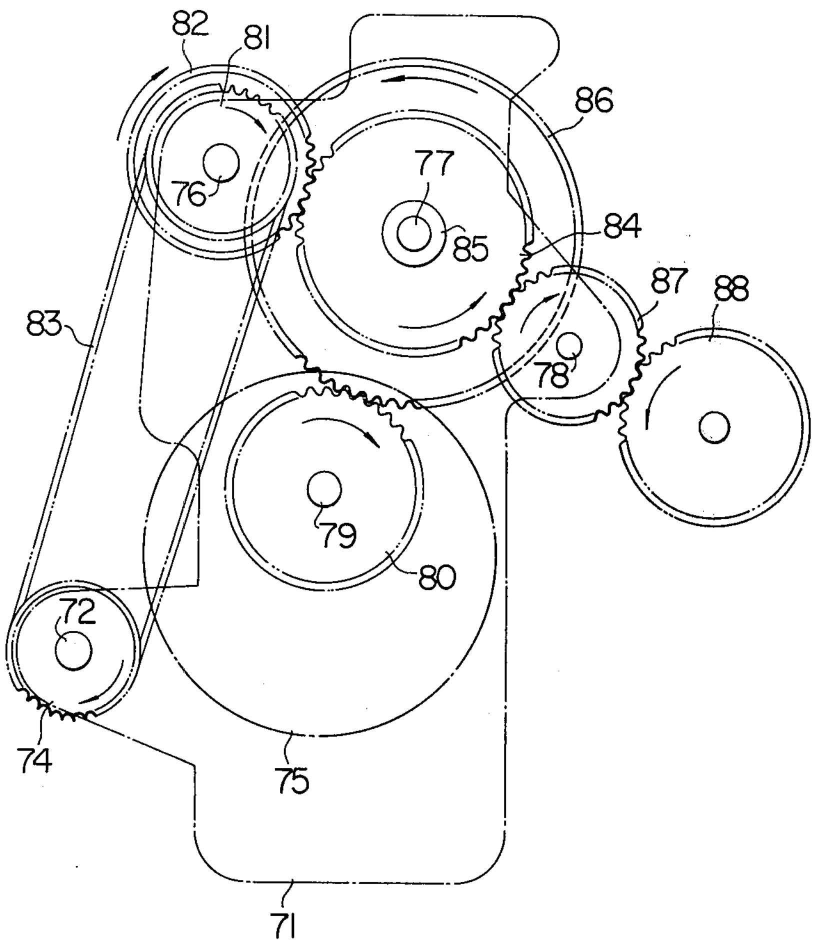
FIG. 19 is a diagrammatic view of a rotation speed switching mechanism for use with the timing chart of FIG. 18.

Referring to FIG. 19, there is diagrammatically shown a rotation speed switching mechanism for the second transportation coil 57. In FIG. 19, a sprocket 74 is attached to the drive shaft 72 for driving the second transportation coil 57. The drive shaft 72 is rotatably supported by the support member 71. On the support member 71, there is mounted a standby drive motor 75 for driving the rollers of the image fixing apparatus when the copying equipment is in a standby condition. Moreover, shafts 76, 77 and 78 are rotatably mounted on the support member 71.

To a drive shaft 79 of the standby drive motor 75, there is fixed a gear 80. To the shaft 76, there are fixed a sprocket 81 and a gear 82. A chain 83 is trained over the sprocket 81 and the sprocket 74 for driving the second transportation coil 57. To the shaft 77, there is fixed a gear 84 and through a one-way clutch 85, a gear 86. The gear 86 is engaged with the gear 80 attached to the standby drive motor 75. To the shaft 78, there is fixed a gear 87 which is engaged with both the gear 84 and a gear 88 for driving the image fixing roller. The gear 84 is engaged with the gear 82.

As the time of copying process, the second transportation coil 57 is driven as follows:

A sprocket (not shown) is fixed to the shaft 76. The shaft 76 and the main motor are connected together by a chain (not shown) trained over the sprocket.

During a copying process, the main motor is energized and the shaft 76 is driven, whereby the sprocket 81 is rotated clockwise and the rotation of the sprocket 81 is transmitted to the sprocket 74 by the chain 83, so that the second transportation coil is rotated by the sprocket 74.

In the meantime, the gear 82 is rotated clockwise by the rotation of the shaft 76 and the rotation of the gear 82 is transmitted to the gear 88 through the gear 84 so that the gear 88 is rotated counterclockwise, whereby the image fixing rollers are driven.

The standby drive motor 75 is continuously in operation so long as the main power is supplied to the copying apparatus. However, the standby drive motor 75 is operated at a lower speed than that of the main motor and rotates the gear 86 in the direction of the arrow by the gear 80. However, since the gear 86 is rotated at a lower speed than that of the shaft 77, the one-way clutch does not work.

When a copying process is completed, the main motor is stopped. At the same time, the gear 86 becomes connected to the shaft 77 by the action of the one-way clutch 85, so that the rotation of the gear 80 is transmitted to the shaft 77 and the gear 84 is rotated. The rotation of the gear 84 is also transmitted to the gear 88 through the gear 87, whereby the image fixing rollers are driven at a low speed. Furthermore, the rotation of the gear 84 is transmitted to the sprocket 81 through the gear 82 so that the sprocket 81 is rotated at a low speed. The rotation of the sprocket 81 is transmitted to the sprocket 74 by the chain 83 and the second transportation coil is rotated at a low speed by the sprocket 74.

Thus, by the above-mentioned mechanism, the second transportation coil 57 is rotated at a high speed during each copying process and is rotated at a low speed during the operation time except during each copying process, whereby the toner transportation apparatus does not leave toner in the toner transportation passage.

In the above explanation, the transportation member is divided into two portions and each portion is independently driven. Of course, a single transportation member may be installed in the transportation passage which extends from the cleaning section to the recovery section, if possible from the viewpoint of the design.

A feature of the present invention is that the toner transportation members are continuously operated independently of the recording process until all of the remaining toner in the toner transportation passage is recovered in order that no toner remains in the toner passage and that the operation time of the toner transportation members is a necessary and sufficient time for recovering toner completely from the toner transportation passage. Therefore, it is not always necessary to operate the toner transportation members so long as the main power is supplied to the copying apparatus. That the toner transportation members are continuously operated independently of the recording process signifies that the toner transportation members are operated until the object of the recovering all of the toner remaining in the toner transportation passage is attained, even after each copying process is completed, and that a new copying process can be initiated while the toner transportation members are still in operation. The initiation timing of the toner transportation members is not limited to any specific timing. As mentioned above, the operation of the toner transportation members can be started simultaneously with supply of the main power to the copying apparatus. However, when the operation time of the toner transportation members is minimized, it will be most appropriate to start the operation of the toner transportation members simultaneously with the initiation of cleaning.

What is claimed is:

1. Apparatus for handling powdered material, said apparatus comprising: a housing comprising an upper portion and a bottom portion to receive the powdered material; a rotating member located in the bottom portion of the housing to transport the powdered material; a shaft in the housing to support the member rotatably, the member extending axially relative to the shaft; stirring means movably mounted in the housing between the upper portion of the housing and the rotating member to direct the powdered material to the rotating member; the rotating member comprising a helical structure; a second helical structure located to receive the powdered material from the first-named helical structure and convey the received powdered material in a direction at an angle to the direction the powdered material is conveyed by the first-named helical structure; electrophotographic means for electrophotographic reproduction; the powdered material comprising toner; and means to effect separate rotation of the first-named and second helical structures and to rotate both of the helical structures at a first speed during formation of electrophotographic reproductions and to continue to rotate the second helical structure at a speed less than the first speed for a predetermined period of time after formation of an electrophotographic reproduction.

2. The invention as defined in claim 1 in which the stirring means comprises a pivotally mounted plate.

3. The invention as defined in claim 1 in which the helical structure is a coil.

4. The invention as defined in claim 1 in which the helical structure is a blade.

5. The invention as defined in claim 1 in which the pitch of the helical structure increases in the direction in which the powdered material travels therealong as the helical structure rotates.

6. The invention as defined in claim 1 in which the diameter of the helical structure increases in the direction in which the powdered material travels therealong as the helical structure rotates.

7. The invention as defined in claim 1 in which the stirring means is located in the housing at a higher level than the rotating member.

8. Apparatus for handling powdered material, said apparatus comprising: a housing comprising an upper portion and a bottom portion to receive the powdered material; a rotating member located in the bottom portion of the housing to transport the powdered material; a shaft in the housing to support the member rotatably, the member extending axially relative to the shaft; stirring means movably mounted in the housing between the upper portion of the housing and the rotating member to direct the powdered material to the rotating member; the stirring means comprising a rotatably mounted brush, a second shaft, and an eccentric cam supporting the brush on the second shaft.

9. The invention as defined in claim 8 comprising connecting means supporting the stirring means to shift the position of stirring means periodically with eccentric motion of the brush.

10. The invention as defined in claim 9 in which the connecting means comprises a rod with a circular portion that fits around the cam.

11. The invention as defined in claim 9 in which the connecting means comprises a pivotally mounted fork with first and second tines on opposite sides of the cam.

* * * * *